US010433326B2

(12) United States Patent
Zhang et al.

(10) Patent No.: US 10,433,326 B2
(45) Date of Patent: Oct. 1, 2019

(54) TECHNIQUES FOR COMMUNICATING IN A DISCONTINUOUS RECEIVE MODE

(71) Applicant: QUALCOMM Incorporated, San Diego, CA (US)

(72) Inventors: Wei Zhang, San Diego, CA (US); Xiaoxia Zhang, San Diego, CA (US); Juan Montojo, San Diego, CA (US); Yongbin Wei, La Jolla, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 15/608,091

(22) Filed: May 30, 2017

(65) Prior Publication Data
US 2017/0359849 A1 Dec. 14, 2017

Related U.S. Application Data

(60) Provisional application No. 62/349,552, filed on Jun. 13, 2016.

(51) Int. Cl.
H04W 72/12 (2009.01)
H04W 72/14 (2009.01)
(Continued)

(52) U.S. Cl.
CPC ... *H04W 72/1257* (2013.01); *H04W 52/0216* (2013.01); *H04W 52/0219* (2013.01);
(Continued)

(58) Field of Classification Search
None
See application file for complete search history.

(56) References Cited

U.S. PATENT DOCUMENTS

2004/0190467 A1* 9/2004 Liu ............ H04W 52/0216
370/311
2008/0170526 A1 7/2008 Narang et al.
(Continued)

OTHER PUBLICATIONS

CATT: "Frame Structure for LAA Scell", 3GPP Draft; R1-156584, 3rd Generation Partnership Project (3GPP), Mobile Competence Centre ; 650, Route Des Lucioles ; F-06921 Sophia-Antipolis Cedex; France; vol. RAN WG1, No. Anaheim, USA; Nov. 15, 2015, XP051003002, Retrieved from the Internet: URL:http://www.3gpp.org/ftp/Meetings_3GPP_SYNC/RAN1/Docs/, 3 pages.
(Continued)

*Primary Examiner* — Ayaz R Sheikh
*Assistant Examiner* — Tarell A Hampton
(74) *Attorney, Agent, or Firm* — Arent Fox, LLP

(57) ABSTRACT

Aspects described herein relate to configuring a discontinuous receive (DRX) mode in wireless communications. A transmission burst can be received over a communication frame, wherein the transmission burst includes a scheduling indication. A DRX OFF mode can be entered to suspend communication resources during at least an off period corresponding to a portion of a time period for the transmission burst based at least in part on the scheduling indication. A DRX ON mode can be entered to activate the communication resources during an on period corresponding to another portion of the time period subsequent to the off period defined for the transmission burst or a different time period subsequent to the time period defined for the transmission burst based at least in part on the scheduling indication.

30 Claims, 8 Drawing Sheets

(51) Int. Cl.
*H04W 74/08* (2009.01)
*H04W 74/04* (2009.01)
*H04W 76/28* (2018.01)
*H04W 52/02* (2009.01)

(52) U.S. Cl.
CPC ....... *H04W 52/0229* (2013.01); *H04W 72/14* (2013.01); *H04W 74/04* (2013.01); *H04W 74/0808* (2013.01); *H04W 76/28* (2018.02); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/20* (2018.01); *Y02D 70/22* (2018.01); *Y02D 70/24* (2018.01); *Y02D 70/26* (2018.01)

(56) References Cited

U.S. PATENT DOCUMENTS

| | | | |
|---|---|---|---|
| 2009/0054006 A1* | 2/2009 | Cai | H04L 1/18 455/73 |
| 2010/0189021 A1* | 7/2010 | He | H04W 52/00 370/311 |
| 2010/0208660 A1* | 8/2010 | Ji | H04W 52/0225 370/328 |
| 2011/0041027 A1* | 2/2011 | Fong | H04L 1/1812 714/749 |
| 2013/0039272 A1* | 2/2013 | Chen | H04W 76/25 370/328 |
| 2013/0194991 A1* | 8/2013 | Vannithamby | H04W 4/70 370/311 |
| 2013/0203450 A1* | 8/2013 | Mochizuki | H04W 68/02 455/458 |
| 2013/0308533 A1* | 11/2013 | Murakami | H04W 76/048 370/328 |
| 2013/0329614 A1* | 12/2013 | Thakur | H04W 52/0216 370/311 |
| 2014/0269480 A1* | 9/2014 | Han | H04W 52/0216 370/311 |
| 2015/0163823 A1* | 6/2015 | Sadek | H04W 72/1215 370/336 |
| 2015/0215867 A1* | 7/2015 | Choi | H04W 48/14 370/311 |
| 2015/0334693 A1* | 11/2015 | Lu | H04W 72/04 370/329 |
| 2016/0073344 A1 | 3/2016 | Vutukuri et al. | |
| 2016/0174259 A1* | 6/2016 | Mukherjee et al. | |
| 2016/0192396 A1* | 6/2016 | Ng | H04W 74/0808 370/329 |
| 2016/0227602 A1 | 8/2016 | Yi et al. | |
| 2016/0255676 A1 | 9/2016 | Vajapeyam et al. | |
| 2016/0295555 A1* | 10/2016 | Cheng | H04W 48/16 |
| 2016/0302076 A1* | 10/2016 | Chou | H04W 16/14 |
| 2017/0093542 A1* | 3/2017 | Li | H04L 5/0048 |
| 2017/0094681 A1* | 3/2017 | Takeda | H04W 16/14 |
| 2017/0171897 A1* | 6/2017 | Ryu | H04L 5/0044 |
| 2017/0265248 A1* | 9/2017 | Narasimha | H04W 52/0216 |
| 2017/0367058 A1* | 12/2017 | Pelletier | H04W 56/0045 |
| 2018/0077688 A1* | 3/2018 | Yi | H04W 16/14 |
| 2018/0124749 A1* | 5/2018 | Park | H04W 16/14 |
| 2018/0139767 A1* | 5/2018 | Lee | H04W 72/1273 |
| 2018/0175975 A1* | 6/2018 | Um | H04L 1/1816 |
| 2018/0191547 A1* | 7/2018 | Mukherjee | H04L 27/2692 |

OTHER PUBLICATIONS

International Search Report and Written Opinion—PCT/US2017/035138 —ISA/EPO—Sep. 12, 2017. (16 total pages).

Perez-Costa X., et al., "On the Distributed Power Saving Mechanisms of Wireless LANs 802.11e U-APSD vs 802.11 Power Save Mode," Computer Networks, Elsevier, Amsterdam, NL, vol. 51, No. 9, Nov. 2006, pp. 1-17.

Qualcomm Incorporated: "UE Procedure for Receiving DL Transmissions in LAA", 3GPP Draft, R1-152786, 3rd Generation Partnership Project (3GPP), Mobile Competence Centre, 650, Route Des Lucioles, F-06921, Sophia-Antipolis Cedex, vol. RAN WG1, No. Fukuoka, Japan, May 25, 2015-May 29, 2015, May 24, 2015, XP050973248, Retrieved from the Internet: URL:http://www .3gpp.. org/ftp/Meetings3GPPYNC/RAN1/DOCS/.

Rohl C., et al., "A Short Look on Power Saving Mechanisms in the Wireless Lan Standard Draft IEEE 802.11," Technical University Berlin, Telecommunication Network Group, available before Jun. 2001, Jan. 1, 1997, XP055403274, Retrieved from the Internet:URL:http://citeseerx.ist.psu.edu/viewdoc/download?doi=10.1.1.22.7434&rep=repl&type=pdf[retrieved on Sep. 1, 2017], 6 pages.

Swain P., "A Survey on Performance Modeling of IEEE 802.11 DCF in Power Save Mode", International Conference on Green Computing, Communication and Conservation of Energy, (ICGCE), Dec. 12, 2013, XP032599022, DOI: 10.1109/ICGCE.2013.6823395, [retrieved on May 29, 2014], pp. 34-39.

Tamma B.R., et al., "IEEE 802.11 MAC CS5070/IITHYD Adapted from Schiller's Textbook on Mobile Communications and Other Sources", Aug. 25, 2011, XP055403278, Retrieved from the Internet: URL:http://www.iith.ac.in/~tbr/teaching/docs/Schiller-802.11.pdf [retrieved on Sep. 1, 2017], 27 pages.

\* cited by examiner

TECHNIQUES FOR COMMUNICATING IN A DISCONTINUOUS RECEIVE MODE

CLAIM OF PRIORITY UNDER 35 U.S.C. § 119

The present Application for Patent claims priority to Provisional Application No. 62/349,552, entitled "TECHNIQUES FOR COMMUNICATING IN A DISCONTINUOUS RECEIVE MODE" filed Jun. 13, 2016, which is assigned to the assignee hereof and hereby expressly incorporated by reference herein for all purposes.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple user equipment devices. Each user equipment (UE) communicates with one or more base stations, such as an evolved Node B (eNB) via transmissions on the forward and reverse links. The forward link (or downlink) refers to the communication link from the eNBs to the UEs, and the reverse link (or uplink) refers to the communication link from the UEs to the eNBs. This communication link may be established via a single-in-single-out, multiple-in-single-out or a multiple-in-multiple-out (MIMO) system. In this regard, the UEs can access wireless network via one or more eNBs.

Additionally, LTE, or other scheduled wireless communication technologies, can be extended for use in unlicensed frequency bands where resources may be available only for opportunistic transmissions. For example, LTE can be utilized for communicating over a frequency band of Institute of Electrical and Electronics Engineers (IEEE) 802.11 (WiFi), and LTE eNBs may thus make opportunistic transmissions by using listen-before-talk (LBT) frames when the frequency band becomes available for transmission. UEs communicating with the eNBs monitor each downlink subframe in the LBT frame (and/or subsequent LBT frames) to detect and/or decode communications intended for the UEs. This may be inefficient for the UE, as the UE continues to monitor without knowing if downlink communications are scheduled for the UE in the LBT frame.

In LTE, for example, UEs can be configured to operate in a discontinuous receive (DRX) mode where the UE has activated receiving resources for an ON duration and deactivated receiving resources for an OFF duration to conserve power otherwise utilized by monitoring wireless communication channels. In unlicensed frequency bands, however, DRX cycle timing may not align with the eNB acquiring a channel of the frequency band for transmission (e.g., the eNB successfully performing clear channel assessment (CCA) of the frequency band). Thus, using DRX, as currently configured for LTE, for communicating in unlicensed frequency bands may result in the UE not receiving communications from the eNB (e.g., where the eNB acquires and transmits communications over the channel while the UE is in the DRX OFF duration).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for configuring a discontinuous receive (DRX) mode in wireless communications is provided. The method includes detecting, at a user equipment (UE), a listen-before-talk (LBT) frame received from an access point, receiving, at the UE, a transmission burst over the LBT frame from the access point, wherein the transmission burst includes a scheduling indication, entering, at the UE and based at least in part on the scheduling indication, a DRX OFF mode to suspend communication resources during at least an off period corresponding to a portion of a time period for the transmission burst, and entering, at the UE and based at least in part on the scheduling indication, a DRX ON mode to activate the communication resources during an on period corresponding to one of another portion of the time period subsequent to the off period defined for the transmission burst or a different time period subsequent to the LBT frame to monitor for a next LBT frame.

In other aspects, a method for configuring a DRX mode in wireless communications is provided. The method includes transmitting an indication of a LBT frame, generating a scheduling indication for each of a plurality of UEs in a transmission burst indicating whether each of the plurality of UEs is scheduled in the transmission burst, generating communications for at least a portion of the plurality of UEs in the transmission burst, and transmitting the scheduling indication along with the communications in the transmission burst in the LBT frame.

In a further aspect, an apparatus for configuring a DRX mode in wireless communications is provided. The apparatus includes a transceiver for communicating one or more wireless signals via one or more antennas, a memory configured to store instructions, and one or more processors communicatively coupled with the transceiver and the memory. The one or more processors are configured to detect, at a UE, a LBT frame received from an access point, receive, at the UE, a transmission burst over the LBT frame from the access point, wherein the transmission burst includes a scheduling indication, enter, at the UE and based at least in part on the scheduling indication, a DRX OFF mode to suspend communication resources during at least an off period corresponding to a portion of a time period for the transmission burst, and enter, at the UE and based at least in part on the scheduling indication, a DRX ON mode to activate the communication resources during an on period corresponding to one of another portion of the time period subsequent to the off period defined for the transmission burst or a different time period subsequent to the LBT frame to monitor for a next LBT frame.

In another aspect, an apparatus for configuring a DRX mode in wireless communications is provided. The apparatus includes a transceiver for communicating one or more wireless signals via one or more antennas, a memory configured to store instructions, and one or more processors communicatively coupled with the transceiver and the memory. The one or more processors are configured to transmit an indication of a LBT frame, generate a scheduling indication for each of a plurality of UEs in a transmission burst indicating whether each of the plurality of UEs is scheduled in the transmission burst, generate communications for at least a portion of the plurality of UEs in the transmission burst, and transmit the scheduling indication along with the communications in the transmission burst in the LBT frame.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
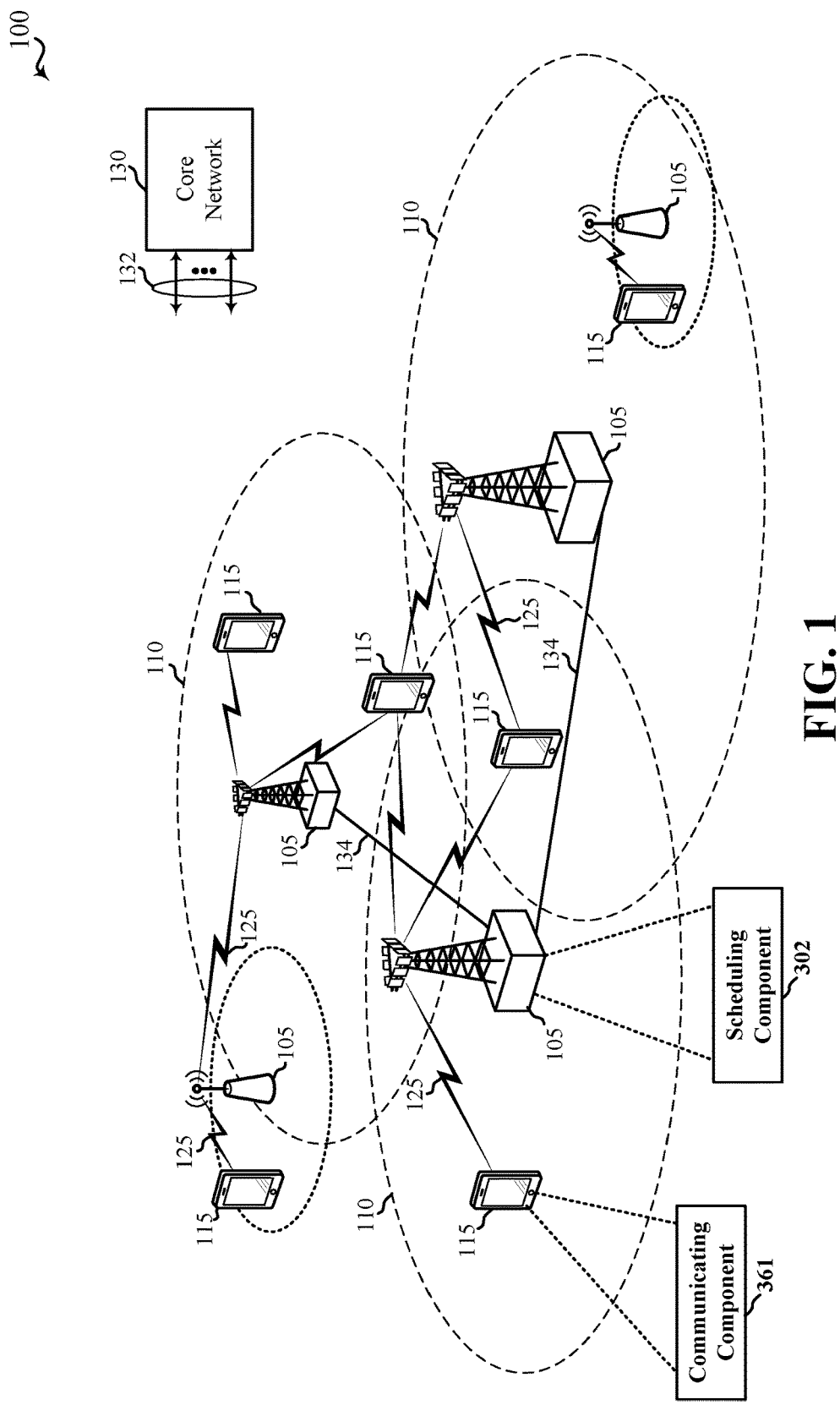
FIG. 1 shows a block diagram conceptually illustrating an example of a telecommunications system, in accordance with aspects described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to configuring a discontinuous receive (DRX) mode in wireless communications. For example, a transmission burst can be transmitted by one or more wireless devices (e.g., an evolved Node B (eNB) or other access point, a user equipment (UE), etc.) where the transmission burst can include a scheduling indication for one or more UEs or other devices. For example, the transmission burst can include multiple divisions of time (e.g., symbols, subframes, etc.) over which communications are scheduled and/or transmitted by the one or more wireless devices after acquiring a communication channel. For example, the scheduling indication can indicate whether a UE is scheduled to receive communications in the transmission burst, an indication of locations (e.g., in frequency and/or time) of resources scheduled for the UE in the transmission burst, etc. Accordingly, the UE can receive the transmission burst from the one or more devices, acquire the scheduling indication, and determine when to activate and/or deactivate receiving resources to receive communications in the transmission burst. For example, the UE can enter a DRX OFF mode to suspend at least a portion of communication resources (e.g., a receiver, receiver processor, one or more power amplifiers, one or more other components of a radio frequency (RF) front end, etc.) for at least a portion of the transmission burst, and can enter a DRX ON to activate the communication resources for another portion of the transmission burst and/or a subsequent transmission burst. In an example, the eNB can transmit the scheduling indication in one or more broadcast communication portions (e.g., broadcast/multicast control channels) and/or unicast communication portions (e.g., unicast control channels) in the transmission burst.

In an example, the transmission burst may correspond to a listen-before-talk (LBT) frame transmitted by the eNB as part of a LBT procedure. Thus, in one example, the UE may detect the LBT frame based on an indicator from the one or more devices, and determine to acquire the scheduling indication from the eNB based on the frame being an LBT frame. In addition, for example, the UE may enter the DRX OFF mode and/or DRX ON mode based on the frame being an LBT frame (e.g., based on an expected duration of the LBT frame, based on an expected time to begin monitoring for a next LBT frame, etc.). In addition, in an example, the eNB can mask the scheduling indication using a group radio network temporary identifier (RNTI) assigned to the UE to allow the UE to detect the scheduling indication in broadcast/multicast communications from the eNB.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, user equipment, or user equipment device. A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, access node, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (WiFi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN (WLAN), BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. One or more of access points 105 can include a scheduling component 302 for scheduling communications for one or more UEs 115 in a transmission burst. One or more of UEs 115 can include a communicating component 361 for communicating with the one or more access points 105 and/or configuring a DRX mode based on scheduling for a transmission burst.

Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each of the communication links 125 may be a multi-carrier signal modulated according to the various radio technologies described above. Each modulated signal may be sent on a different carrier and may carry control information (e.g., reference signals, control channels, etc.), overhead information, data, etc.

In this regard, a UE 115 can be configured to communicate with one or more access points 105 over multiple carriers using carrier aggregation (CA) (e.g., with one access point 105) and/or multiple connectivity (e.g., with multiple access points 105). In either case, the UE 115 can be configured with at least one primary cell (PCell) configured to support uplink and downlink communications between the UE 115 and an access point 105. In an example, there can be a PCell for each of the communication links 125 between a UE 115 and a given access point 105. In addition, each of the communication links 125 can have one or more secondary cells (SCell) that can support uplink and/or downlink communications as well. In some examples, the PCell can be used to communicate at least a control channel, and the SCell can be used to communicate a data channel.

The access points 105 may wirelessly communicate with the UEs 115 via one or more access point antennas. Each of the access points 105 sites may provide communication coverage for a respective coverage area 110. In some examples, the access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/

LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A small cell may cover a relatively smaller geographic area and may allow unrestricted access by UEs 115 with service subscriptions with the network provider, for example. In addition or alternatively to unrestricted access, a small cell may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells. The term eNB, as used generally herein, may relate to a macro eNB and/or a small cell eNB.

In an example, a small cell may operate in an "unlicensed" frequency band or spectrum, which can refer to a portion of radio frequency (RF) space that is not licensed for use by one or more wireless wide area network (WWAN) technologies, but may or may not be used by other communication technologies (e.g., wireless local area network (WLAN) technologies, such as Wi-Fi). Moreover, a network or device that provides, adapts, or extends its operations for use in an "unlicensed" frequency band or spectrum may refer to a network or device that is configured to operate in a contention-based radio frequency band or spectrum. In addition, for illustration purposes, the description below may refer in some respects to an LTE system operating on an unlicensed band by way of example when appropriate, although such descriptions are not intended to exclude other cellular communication technologies. LTE on an unlicensed band may also be referred to herein as LTE/LTE-Advanced in unlicensed spectrum, or simply LTE, in the surrounding context.

The core network 130 may communicate with the eNBs or other access points 105 via a backhaul links 132 (e.g., Si interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in a first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each of one or more hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), multiple connectivity (e.g., CA with each of one or more access points 105) or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for the UEs 115 as well as increasing network and spectrum utilization.

As mentioned, in some examples the access points 105 and UEs 115 may utilize carrier aggregation to transmit on multiple carriers. In some examples, the access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer.

In an example, a UE 115 may communicate with a serving access point 105 via communicating component 361 to receive wireless network access. Access point 105 may schedule the UE 115 with resources for communicating with (e.g., receiving communications from and/or transmitting communications to) access point 105. In a specific example, access point 105 and/or one or more UEs 115 may communicate using one or more transmission bursts over multiple frames/subframes. In this example, access point 105 may configure the UE 115 by including a scheduling indication in a transmission burst. For example, access point 105 may include the scheduling indication in one or more broadcast/multicast control channels and/or unicast control channels dedicated to one or more UEs, where the scheduling indication may include one or more parameters to indicate scheduling of resources within the transmission burst. For example, the scheduling indication may include an identification of one or more UEs scheduled in the transmission burst, a bitmap indicating location of resources assigned to corresponding UEs, etc. In an example, a communicating component 361 can receive the scheduling indication, and can determine whether the UE 115 is scheduled to receive communications in the a burst from access point 105, a location of scheduled resources, etc. The UE 115 can accordingly enter a DRX OFF mode when not scheduled to receive communications (e.g., within the transmission burst) and/or can enter a DRX ON mode when scheduled to receive communications within the transmission burst and/or to receive another transmission burst. In an example, receiving the scheduling indication and/or determining to enter DRX OFF or DRX ON, a duration for entering DRX OFF or DRX ON, etc. may be based at least in part on the UE detecting an LBT frame indication received from the access point 105.

Figure 2:
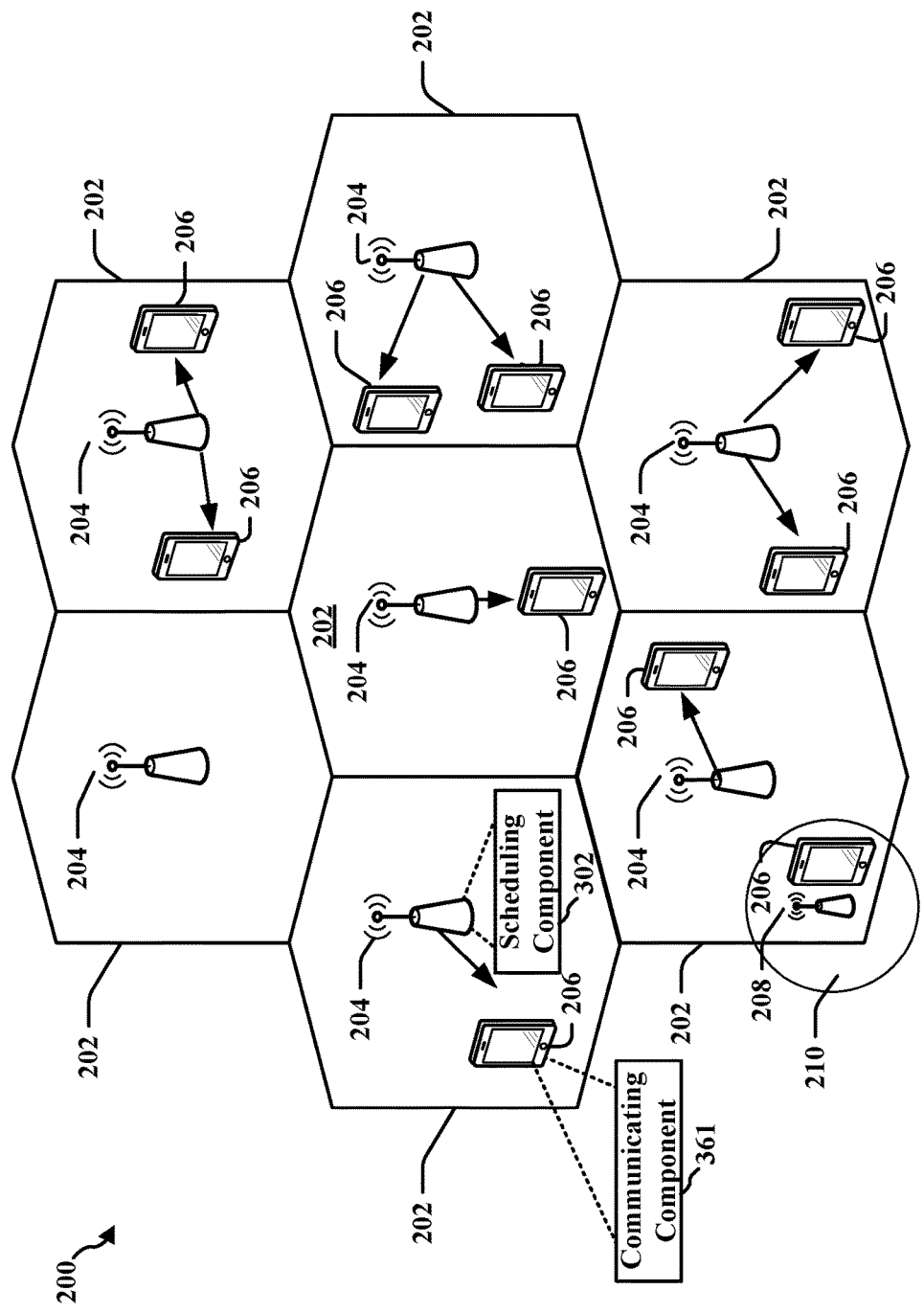
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more small cell eNBs 208 may have cellular regions 210 that overlap with one or more of the cells 202. The small cell eNBs 208 may be of a lower power class (e.g., home eNB (HeNB)), femto cell pico cell, micro cell, or remote radio head (RRH). The macro eNBs 204 are each assigned to a respective cell 202 and are configured to provide an access point to the core network 130 for all the UEs 206 in the cell 202. In an aspect, one or more of eNBs 204, small cell eNBs 208, etc. can include a scheduling component 302 for scheduling communications for one or more UEs 206 in a transmission burst. One or more of the UEs 206 can include a communicating component 361 for communicating with the one or more eNBs 204/208 and/or configuring a DRX mode based on scheduling for a transmission burst. There is no centralized controller shown in this example of an access network 200, but a centralized controller may be used in alternative configurations. The eNBs 204 are responsible for all radio related functions including radio bearer control, admission control, mobility control, scheduling, security, and connectivity to a serving gateway.

The modulation and multiple access scheme employed by the access network 200 may vary depending on the particular telecommunications standard being deployed. In LTE applications, OFDM may be used on the DL and SC-FDMA may be used on the UL to support both frequency division duplexing (FDD) and time division duplexing (TDD). The various concepts presented herein can be well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204/208 may have multiple antennas supporting MIMO technology. The use of MIMO technology enables the eNBs 204/208 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204/208 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
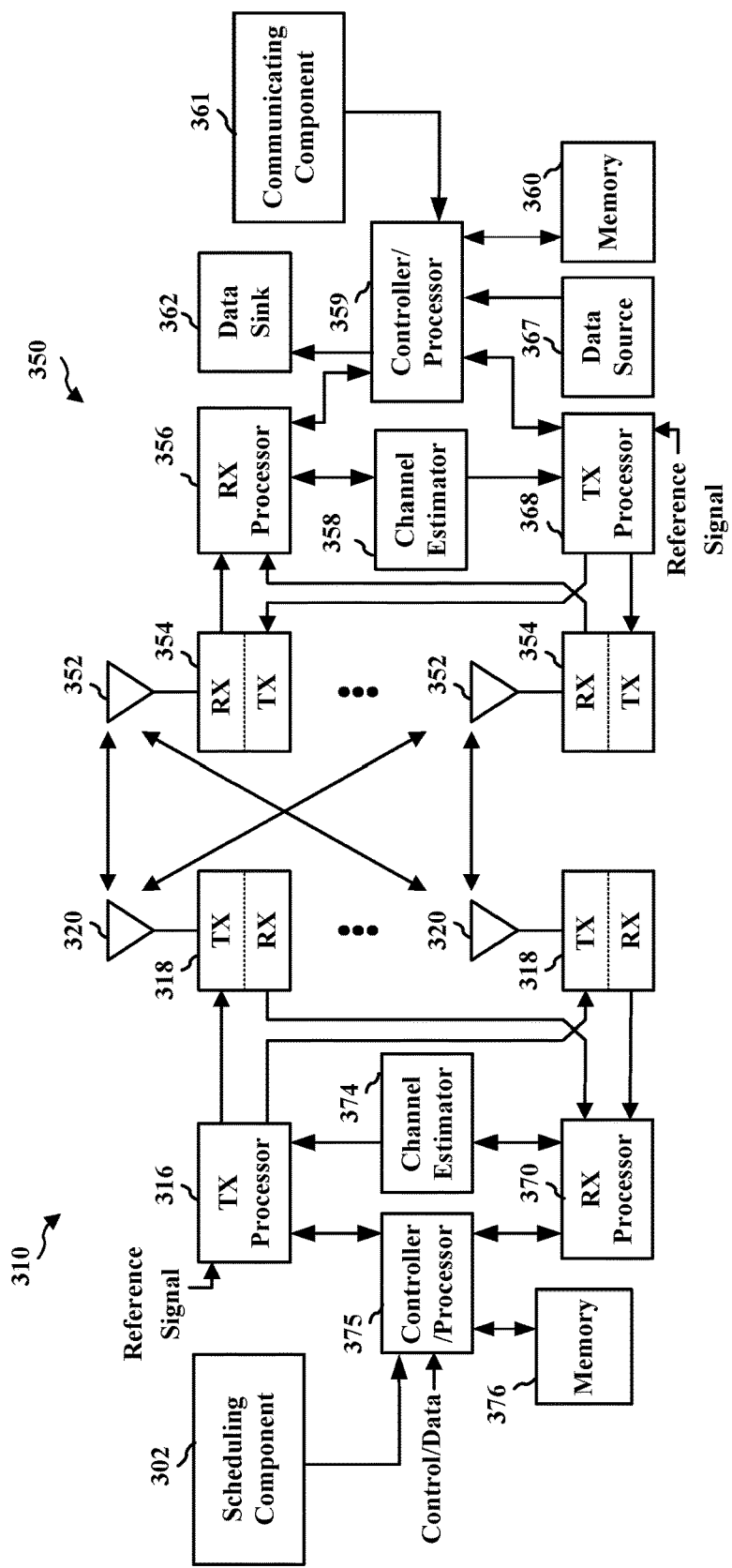
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for hybrid automatic repeat/request (HARQ) operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. The eNB 310 can include a scheduling component 302 for scheduling communications for one or more UEs 350 in a transmission burst. Though the scheduling component 302 is shown as coupled with the controller/processor 375, scheduling component 302 can also be coupled with one or more other processors (e.g., TX processor 316, RX processor 370, etc.) and/or implemented by the one or more processors 316, 375, 370 to perform actions described herein.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. In addition, the UE 350 may include a communicating component 361 for communicating with the one or more eNBs 310 and/or configuring a DRX mode based on scheduling for a transmission burst. Though the communicating component 361 is shown as coupled with the controller/processor 359, the communicating component 361 can also be coupled with one or more other processors (e.g., RX processor 356, TX processor 368, etc.) and/or implemented by the one or more processors 356, 359, 368 to perform actions described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
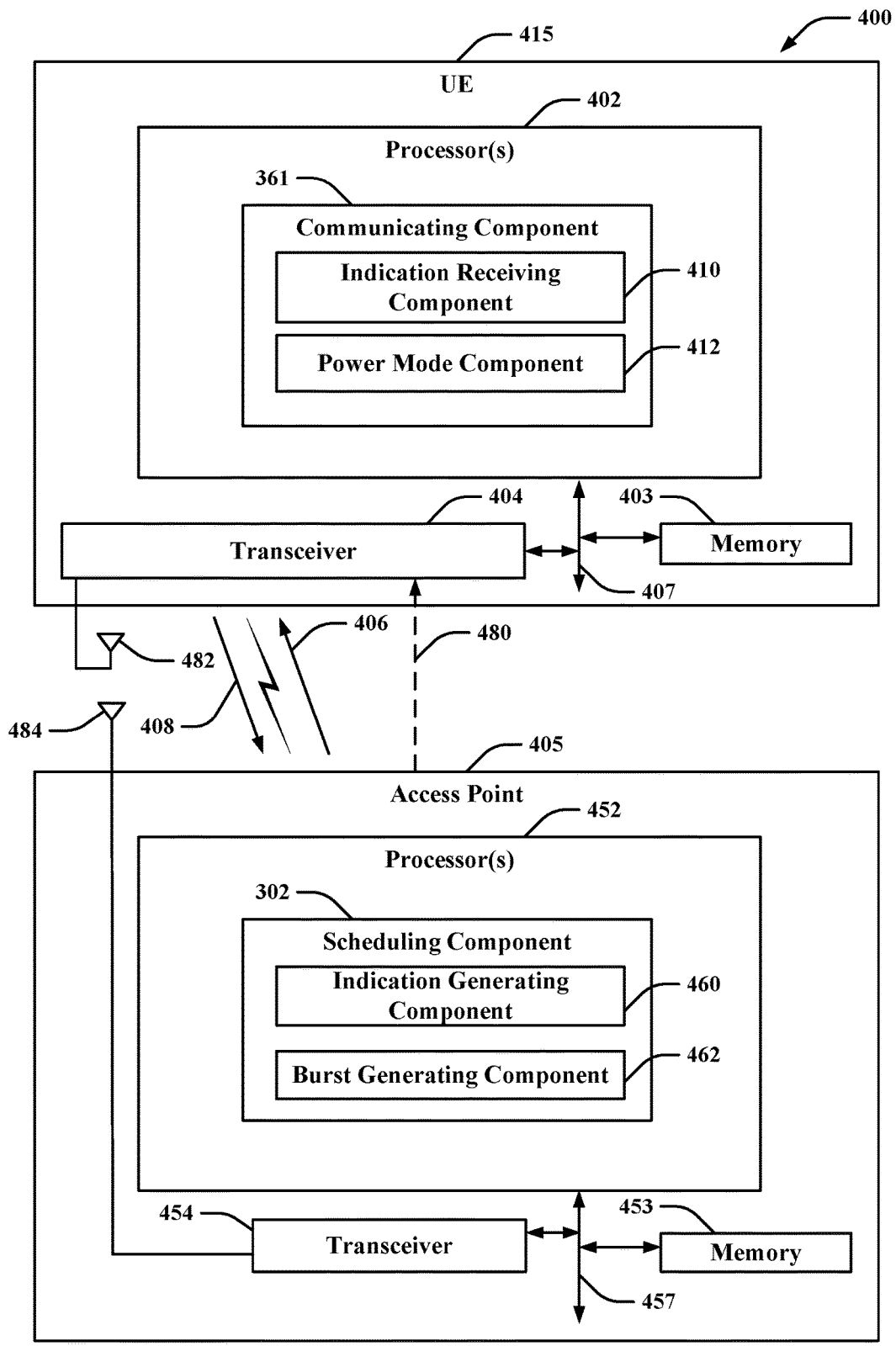
FIG. 4 illustrates an example of a system for configuring different power modes in wireless communications in accordance with aspects described herein.
Figure 5:
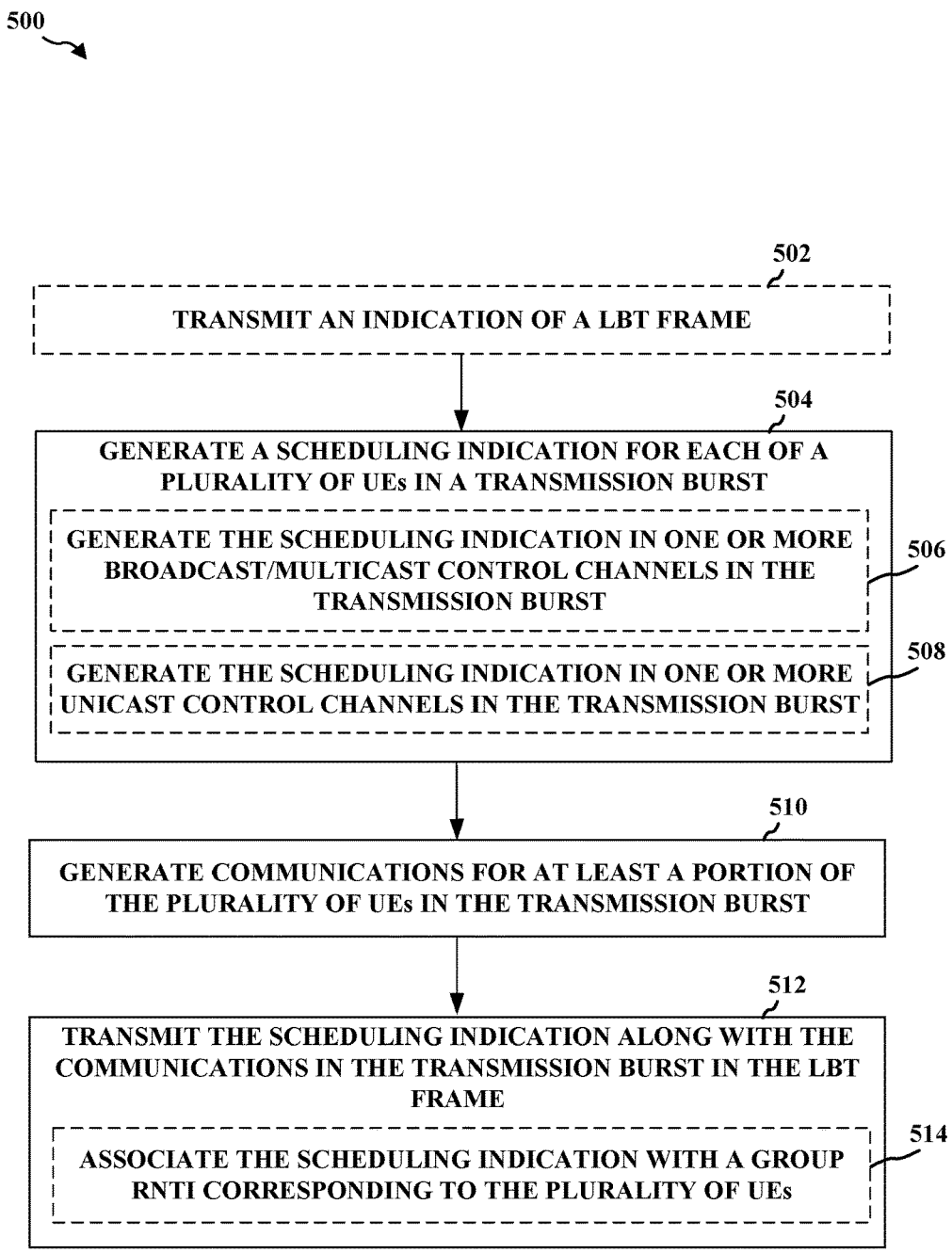
FIG. 5 illustrates an example of a method for configuring discontinuous receive (DRX) modes in accordance with aspects described herein.
Figure 6:
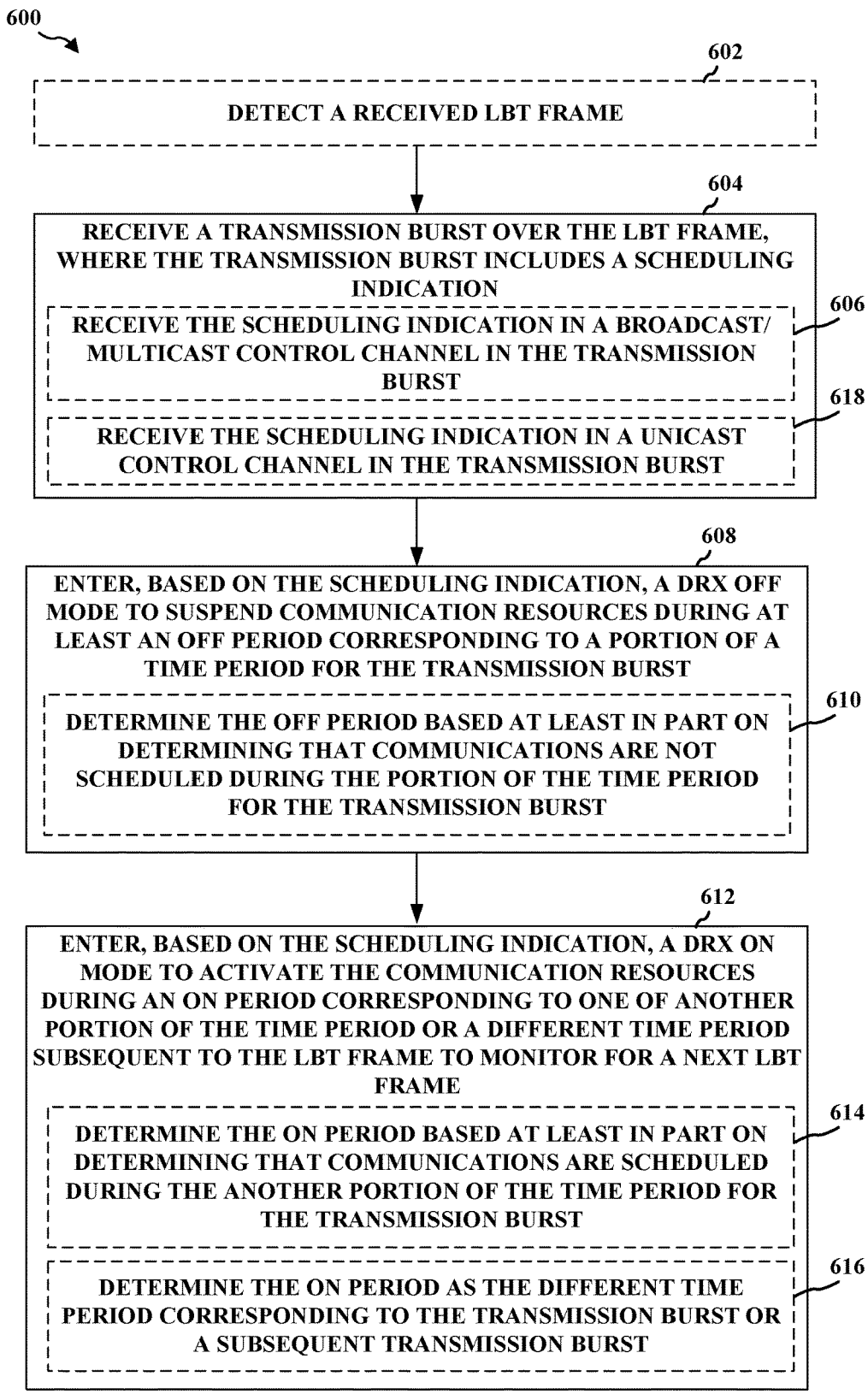
FIG. 6 illustrates an example of a method for communicating scheduling indications in accordance with aspects described herein.

Turning now to FIGS. 4-8, aspects are depicted with reference to one or more components and one or more methods that may perform the actions or operations described herein, where aspects in dashed line may be optional. Although the operations described below in FIGS. 5-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

FIG. 4 depicts an example of a system 400 for performing inter-frequency handover in accordance with aspects described herein. The system 400 includes a UE 415 that communicates with an access point 405 to access a wireless network, examples of which are described in FIGS. 1-3 above (e.g., UEs 115, 206, 350, access points/eNBs 105, 204, 208, 310, etc.). In an aspect, the access point 405 and the UE 415 may have established one or more downlink channels over which downlink signals 406 can be transmitted by the access point 405 (e.g., via access point transceiver 454) and received by the UE 415 (e.g., via UE transceiver 404) for communicating control and/or data messages (e.g., signaling) from the access point 405 to the UE 415 over configured communication resources. Moreover, for example, the access point 405 and the UE 415 may have established one or more uplink channels over which uplink signals 408 can be transmitted by the UE 415 (e.g., via UE transceiver 404) and received by the access point 405 (e.g., via access point transceiver 454) for communicating control and/or data messages (e.g., signaling) from the UE 415 to the access point 405 over configured communication resources. For example, the access point 405 may transmit a signal 480 to the UE 415, which is transmitted via an access point transceiver 454 and received via a UE transceiver 404. The signal 480 may include a transmission burst over one or more frames or subframes, which may also include an indication of an LBT frame, a scheduling indication to notify UE 415 whether the UE 415 is being scheduled with resources in the transmission burst, location of scheduled resources for the UE 415 in the transmission burst, etc.

In an aspect, UE 415 may include one or more processors 402 and/or memory 403 that may be communicatively coupled, e.g., via one or more buses 407, and may operate in conjunction with or otherwise implement a communicating component 361 for communicating with the one or more access points 405 and/or configuring a DRX mode based on scheduling for a transmission burst. For example, the various operations related to the communicating component 361 may be implemented or otherwise executed by one or more processors 402 and, in an aspect, can be executed by a single processor, while in other aspects, different ones of the operations may be executed by a combination of two or more different processors. For example, in an aspect, the one or more processors 402 may include any one or any combination of a modem processor, or a baseband processor, or a digital signal processor, or an application specific integrated circuit (ASIC), or a transmit processor, or a transceiver processor associated with UE transceiver 404. Further, for example, the memory 403 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 402. Moreover, the memory 403 or computer-readable storage medium may be resident in the one or more processors 402, external to the one or more processors 402, distributed across multiple entities including the one or more processors 402, etc.

In particular, the one or more processors 402 and/or memory 403 may execute actions or operations defined by communicating component 361 or its subcomponents. For instance, the one or more processors 402 and/or memory 403 may execute actions or operations defined by an indication receiving component 410 for receiving a scheduling indication from an access point 405 indicating whether the UE 415 is scheduled in a transmission burst. In an aspect, for example, indication receiving component 410 may include hardware (e.g., one or more processor modules of the one or more processors 402) and/or computer-readable code or instructions stored in memory 403 and executable by at least one of the one or more processors 402 to perform the specially configured indication receiving operations described herein. Further, for instance, the one or more processors 402 and/or memory 403 may execute actions or operations defined by a power mode component 412 for entering a DRX OFF mode, DRX ON mode, or other reduced power mode or full power mode at the UE 415. In an aspect, for example, the power mode component 412 may include hardware (e.g., one or more processor modules of the one or more processors 402) and/or computer-readable code or instructions stored in memory 403 and executable by at least one of the one or more processors 402 to perform the specially configured power mode operations described herein.

Similarly, in an aspect, the access point 405 may include one or more processors 452 and/or memory 453 that may be communicatively coupled, e.g., via one or more buses 457, and may operate in conjunction with or otherwise implement a scheduling component 302 for scheduling communications for one or more UEs 415 in a transmission burst. For example, the various functions related to the scheduling component 302 may be implemented or otherwise executed by one or more processors 452 and, in an aspect, can be executed by a single processor, while in other aspects, different ones of the functions may be executed by a combination of two or more different processors, as described above. In one example, the one or more processors 452 and/or memory 453 may be configured as described in examples above with respect to the one or more processors 402 and/or memory 403 of UE 415.

In an example, the one or more processors 452 and/or memory 453 may execute actions or operations defined by scheduling component 302 or its subcomponents. For instance, the one or more processors 452 and/or memory 453 may execute actions or operations defined by an indication generating component 460 for generating a scheduling indication to indicate whether one or more UEs are scheduled resources in a transmission burst. In an aspect, for example, indication generating component 460 may include hardware (e.g., one or more processor modules of the one or more processors 452) and/or computer-readable code or instructions stored in memory 453 and executable by at least one of the one or more processors 452 to perform the specially configured indication generating operations described herein. Further, for instance, the one or more processors 452 and/or memory 453 may execute actions or operations defined by a burst generating component 462 for generating at least a portion of a transmission burst with communications for one or more UEs (e.g., corresponding to the scheduling indication). In an aspect, for example, burst generating component 462 may include hardware (e.g., one or more processor modules of the one or more processors 452) and/or computer-readable code or instructions stored in memory 453 and executable by at least one of the one or more processors 452 to perform the specially configured burst generating operations described herein.

In an example, transceivers 404, 454 may be configured to transmit and receive wireless signals through one or more antennas 482, 484 and may generate or process the signals using one or more RF front end components (e.g., power amplifiers, low noise amplifiers, filters, analog-to-digital converters, digital-to-analog converters, etc.), one or more transmitters, one or more receivers, etc. In an aspect, the transceivers 404, 454 may be tuned to operate at specified frequencies such that the UE 415 and/or the access point 405 can communicate at a certain frequency. In an aspect, the one or more processors 402, 452 may configure the transceivers 404, 454 to operate at a specified frequency and power level based on a configuration, a communication protocol, etc.

In an aspect, the transceivers 404, 454 can operate in multiple bands (e.g., using a multiband-multimode modem, not shown) to process digital data sent and received using the transceivers 404, 454. In an aspect, the transceivers 404, 454 can be multiband and be configured to support multiple frequency bands for a specific communications protocol. In an aspect, the transceivers 404, 454 can be configured to support multiple operating networks and communications protocols. Thus, for example, the transceivers 404, 454 may enable transmission and/or reception of signals based on a specified modem configuration.

Referring to FIG. 5, an example of a method 500 is illustrated for scheduling (e.g., by an eNB) wireless communications for one or more UEs to facilitate DRX mode operations. In method 500, blocks indicated as dashed boxes represent optional steps.

In an example, method 500 optionally includes, at Block 502, transmitting an indication of a LBT frame. In an aspect, the indication generating component 460, e.g., in conjunction with the processor(s) 452, memory 453, and/or access point transceiver 454, can transmit the indication of the LBT frame. For example, the scheduling component 302 can attempt acquire a communications medium, e.g., based on performing a LBT process such as clear channel assessment (CCA) to determine when the medium is available. In an example, the indication generating component 460 can generate and transmit an indication of an LBT frame based on acquiring the communication medium. In one example, the indication of the LBT frame may be included in a broadcast signal over the communication medium. In one specific example, the indication of the LBT frame may be included in a transmission burst, as described in further detail herein, in a signal preceding the transmission burst, etc. In addition, for example, indication generating component 460 may generate an indication of the start of a LBT frame by using a specific waveform in transmitting corresponding signaling, where the specific wave form can be detected by the UE 402 and used to determine the beginning of a LBT frame. In another example, the indication generating component 460 may can send common control signaling to indicate the start of a LBT frame, such that upon detection of the common control signaling, the UE 402 can determine the beginning of a LBT frame.

In an example, method 500 includes, at Block 504, generating a scheduling indication for each of a plurality of UEs in a transmission burst. In an aspect, the indication generating component 460, e.g., in conjunction with the processor(s) 452, memory 453, and/or access point transceiver 454, can generate the scheduling indication for each of the plurality of UEs in the transmission burst. For example, the indication generating component 460 can generate the scheduling indication in a portion of the transmission burst (e.g., in a first subframe, in one or more control channels, in one or more other parts of the transmission burst as configured by the access point 405, etc.). In addition, as described further herein, the scheduling indication can include a bitmap indicating one or more UEs that are scheduled to receive communications from access point 405 in the transmission burst, identifiers of one or more UEs (e.g., cell RNTI (C-RNTI), International Mobile Station Equipment Identity (IMEI), International Mobile Subscriber Identity (IMSI), etc.) scheduled to receive communications from the access point 405, or transmit communications, in the transmission burst, a position within the transmission burst of one or more communications for a corresponding UE (e.g., indicated via bitmap for the UE identifier), an indicated end of communication resources (e.g., expiration or completion of resources or related communications) for a given UE within the transmission burst, etc. For example, the transmission burst may include an LBT burst transmitted after acquiring a channel or other medium in a wireless network that utilizes LBT. Thus, in an example, the scheduling indication may include the indication of the LBT frame, or may be transmitted after indicating the LBT frame, etc.

The scheduling indication may include additional information to assist in determining whether downlink and/or uplink communications are scheduled for a UE, such as a downlink/uplink split indicating a number or portion of time periods of an LBT burst assigned to downlink/uplink communications, an indication of an uplink grant, which may indicate an end of a transmission burst, a number of uplink subframes in the LBT burst, etc. A UE can use this information to determine when communications are expected from the access point 405 or not expected from the access point 405 (and thus when the UE can enter a DRX ON mode or a DRX OFF mode) in the LBT frame, when to transmit communications to the access point 405 in the LBT frame, etc.

In an example, generating the scheduling indication at Block 504 may optionally include, at Block 506, generating the scheduling indication in one or more broadcast/multicast control channels in the transmission burst. In an aspect, the indication generating component 460, e.g., in conjunction with the processor(s) 452, memory 453, and/or access point transceiver 454, can generate the scheduling indication in one or more broadcast/multicast control channels in the transmission burst. In this example, the scheduling indication may include additional information to assist in determining whether communications are scheduled for a UE, such as time properties of the scheduling indication (e.g., valid period for scheduling the UE, expiration time for scheduling the UE, sleep period for scheduling the UE, wake-up time for scheduling the UE, etc.), which may be used, as described in further detail below, to determine when to switch to a DRX ON mode to attempt to receive a next LBT burst or corresponding frame. Moreover, in an example, the indication generating component 460 may generate the scheduling indication in a new transmission control information (DCI) format, in a physical downlink shared channel (PDSCH), etc., which may be masked by a RNTI, as described further herein. In another example, the indication generating component 460 can generate the scheduling indication in one or more system information blocks (SIB) or other system information transmitted in broadcast/multicast channels, etc. Moreover, for example, the scheduling indication can indicate the downlink scheduling information, uplink scheduling information, or both downlink and uplink scheduling information.

In another example, generating the scheduling indication at Block 504 may optionally include, at Block 508, generating the scheduling indication in one or more unicast control channels in the transmission burst. In an aspect, the indication generating component 460, e.g., in conjunction with the processor(s) 452, memory 453, and/or access point transceiver 454, can generate the scheduling indication in one or more unicast control channels in the transmission burst. For example, the indication generating component 460 can generate the scheduling indication along with a downlink or uplink control channel (e.g., downlink or uplink grant for the UE 415). For example, the indication generating component 460 may include the scheduling indication with other data in the control channel, which may include supplementing the control channel with the scheduling indication (e.g., in control information transmitted over the control channel, in a DCI format, as described further herein, as one or more properties of the control channel signaling, etc.).

In another example, the indication generating component 460 may generate a DCI format for a downlink or uplink grant to include one or more of a resource allocation for a current transmission time interval (TTI) (e.g., subframe or other TTI of the LBT burst), a flag to indicate if there are any future resource grants for the UE 415 in the LBT frame, a bitmap or length of future TTIs activated for downlink communications to the UE 415, an indication of whether the grant is applied to all future TTIs in the LBT frame, time properties of the scheduling indication (e.g., valid period, expiration time, sleep period, wake-up time, etc.), additional uplink/downlink control information (e.g., uplink/downlink split, uplink grant information, number of uplink subframes in the LBT burst, etc.), and/or the like. In another example, the indication generating component 460 may generate the scheduling indication as a media access control (MAC) layer control element (CE) in a MAC layer protocol data unit (PDU) or a corresponding header as transmitted by the access point 405 in the transmission burst (e.g., along with a resource grant, along with data in the transmission burst, etc.).

In an example, the indication generating component 460 can generate scheduling indications for scheduled UEs using unicast control channels and for non-scheduled UEs using broadcast/multicast control channels.

In addition, method 500 may include, at Block 510, generating communications for at least a portion of the plurality of UEs in the transmission burst. In an aspect, the burst generating component 462, e.g., in conjunction with the processor(s) 452, memory 453, and/or access point transceiver 454, can generate the communications for at least the portion of the plurality of UEs in the transmission burst. For example, the burst generating component 462 can generate signals for transmitting in one or more frames, subframes, TTIs, or other time periods for an LBT burst or a downlink portion thereof for transmission over the frequency band. In an example, the generated transmission burst is based on the scheduling indication such that the transmission burst includes communications for the UEs as indicated in the scheduling indication (e.g., for UEs, in positions of the time period of the transmission burst, etc., as indicated in the scheduling indication). Moreover, the transmission burst can be transmitted in the LBT frame, which may be indicated by the indication generating component 460, as described, and/or may be indicated in the generated communications for transmitting as part of the transmission burst.

Additionally, method 500 may include, at Block 512, transmitting the scheduling indication along with the communications in the transmission burst in the LBT frame. In an aspect, the scheduling component 302, e.g., in conjunction with the processor(s) 452, memory 453, and/or access point transceiver 454, can transmit the scheduling indication along with the communications in the transmission burst in the LBT frame. In one example, the transmission burst may additionally or alternatively include uplink transmissions to the access point 405 (e.g., from one or more UEs). One or more UEs (e.g., UE 415) can receive the transmission burst and scheduling indication, and can accordingly process the transmission burst (or at least a downlink portion of the transmission burst) and scheduling indication as described further herein to determine when to operate in a DRX ON or DRX OFF mode. Additionally, for example, the one or more UEs can receive the indication of the LBT frame for determining when to receive the transmission burst and/or scheduling indication, when to operate in DRX ON or DRX OFF mode, etc.

In an example, transmitting the scheduling indication at Block 512 may optionally include, at Block 514, associating the scheduling indication with a group RNTI corresponding to the plurality of UEs. In an aspect, the indication generating component 460, e.g., in conjunction with the processor(s) 452, memory 453, and/or access point transceiver 454, can associate the scheduling indication with the group RNTI corresponding to the plurality of UEs. In one example, the scheduling component 302 can partition a plurality of UEs into a plurality of groups (e.g., based on C-RNTI, IMEI, IMSI, policy classes assigned to or otherwise related to the UEs, traffic classes assigned to or otherwise related to the UEs, etc.), and can assign a group RNTI to each of the plurality of groups (e.g., during a radio setup phase, such as radio resource control (RRC) Connection Configuration). Accordingly, in an example, the indication generating component 460 can mask at least a portion of the data burst (e.g., a portion corresponding to the scheduling indication) with the group RNTI to allow a UE receiving the transmission burst to apply its group RNTI to attempt to successfully unmask the transmission burst. If unmasking is successful, the UE can determine the transmission burst (or at least the scheduling indication) is intended for the UE. As described, additional information in the scheduling indication can be used to indicate/determine which portion of the transmission burst relates to the UE to allow the UE to determine when to operate in a DRX ON or DRX OFF mode, as described herein.

Referring to FIG. 6, an example of a method 600 is illustrated for configuring (e.g., by a UE) DRX mode in wireless communications. In the method 600, blocks indicated as dashed boxes represent optional steps.

In an example, the method 600 optionally includes, at Block 602, detecting a received LBT frame. In an aspect, the communicating component 361, e.g., in conjunction with the processor(s) 402, memory 403, and/or UE transceiver 404, can detect the received LBT frame (e.g., from access point 405). In an example, communicating component 361 can receive an indication of the LBT frame, which may be received in a broadcast signal from the access point 405, as part of control information and/or a corresponding transmission burst from the access point 405, etc. The indication of the LBT frame may include a bit indicator or other value specifying that the access point 405 has obtained the medium via CCA, for example, and is transmitting at least a transmission burst.

In another example, as described above, communicating component 361 can detect the indication of the LBT frame based on detecting a specific waveform in the received signaling for the LBT burst or previous broadcast or control signaling. For example, the waveform can be configured at the UE 402 (e.g., by the access point 404 or otherwise known between the UE 402 and access point 404) to facilitate identifying the waveform indicating the start of the LBT frame. In one example, the access point 404 can configure the waveform in broadcast signaling, control signaling, etc. to allow the UE 402 to identify the waveform that indicates start of an LBT frame. In another example, communicating component 361 can detect the indication based on receiving common control signaling to indicate the start of a LBT frame, such that upon detection of the common control signaling, the UE 402 can determine the beginning of a LBT frame.

In an example, the method 600 includes, at Block 604, receiving a transmission burst over a LBT frame, where the transmission burst includes a scheduling indication. In an aspect, the communicating component 361, e.g., in conjunction with the processor(s) 402, memory 403, and/or UE transceiver 404, can receive the transmission burst over the LBT frame (e.g., from access point 405), where the transmission burst includes a scheduling indication. In one example, the transmission burst may also include the indication of the LBT frame. For example, the communicating component 361 may receive the transmission burst as signal 480 from the access point 405 during one or more intervals defined for receiving communications. For example, the access point 405 can transmit the transmission bursts in scheduled communications or using contention-based communication resources (e.g., based on performing a successful CCA procedure to acquire a channel for transmitting the transmission bursts). In the latter example, for instance, the access point 405 can transmit the transmission burst in a LBT frame, which can be received by the UE 415. For example, an LBT frame can correspond to one or more frames over which an LBT burst is transmitted. Thus, in an example, the UE 415 can receive the LBT frame (and/or a related indication that the frame is an LBT frame from access point 405), and can determine to receive and/or process the transmission burst, obtain the scheduling indication, etc.

In an example, receiving the transmission burst at Block 604 may optionally include, at Block 606, receiving the scheduling indication in a broadcast/multicast control channel in the transmission burst. In an aspect, the indication receiving component 410, e.g., in conjunction with the processor(s) 402, memory 403, and/or UE transceiver 404, can receive or detect the scheduling indication in a broadcast/multicast control channel in the transmission burst. In an example, the access point 405 can transmit one or more broadcast/multicast control channels in the transmission burst (e.g., in a first portion of the transmission burst) such that a plurality of UEs (e.g., UE 415) within range of the access point 405 can receive the one or more broadcast/multicast channels in the transmission burst. Thus, in one example, the indication receiving component 410 can determine the scheduling indication from the broadcast/multicast channel transmission in the transmission burst. The determination may be based on detecting the LBT frame in one example, as described.

In one example, the access point 405 can assign a group RNTI to a group of UEs, which may include UE 415, and may mask the scheduling indication (or the related broadcast/multicast control channel) with the group RNTI. Accordingly, in an example, indication receiving component 410 may also receive the group RNTI from the access point 405 (or may determine the group RNTI based on another assigned or configured RNTI), and may attempt to unmask at least a broadcast/multicast control channel portion of the transmission burst using the group RNTI. If successful, indication receiving component 410 can determine the scheduling indication from the broadcast/multicast control channel portion of the transmission burst.

In any case, for example, the scheduling indication may indicate scheduling for UEs in the transmission burst using various indicators. For example, the scheduling indication may include one or more bits or bit values in a bitmap, where each bit or value identifies one of the UEs 415 in the group associated with the group RNTI that is scheduled to receive communications in the transmission burst. In another example, the scheduling indication may list identifiers (e.g., C-RNTI, IMEI, IMSI, etc.) of one or more UEs that are scheduled to receive communications in the transmission burst. In another example, the scheduling indication may additionally or alternatively indicate a position in the transmission burst (e.g., in time and/or in frequency) including communications for a given identified UE. For example, the scheduling indication may include a bitmap for each identified UE indicating whether the UE is scheduled to receive communications from the access point 405 in a given subframe, TTI, or other unit of time (e.g., where each bit corresponds to the unit of time) to provide a fine level of DRX control. In any case, the UE 415 can use the scheduling indication to determine a DRX mode configuration such to possibly receive communications from the access point 405 during at least a portion of the transmission burst and/or to conserve resources in another portion of the transmission burst.

In this example, the scheduling indication may include additional information for determining whether and/or when the UE 415 is to expect communications from the access point 405 in the transmission burst. For example, the scheduling indication may include time properties of the scheduling indication, such as a valid period of time or expiration time for the scheduling indication (after which the UE 415 may activate communication resources to receive another frame from the access point 405), a sleep period during which the UE 415 can enter a DRX OFF mode, a wake-up time at which the UE 415 can enter DRX ON mode, etc.

In any case, the indication receiving component 410 can receive the scheduling indication, and power mode component 412 can determine a power mode for operating one or more portions of the UE 415 (e.g., transceiver 404 or a portion thereof) based on the scheduling indication. For example, the method 600 may include, at Block 608, entering a DRX OFF mode to suspend communication resources during at least an off period corresponding to a portion of a time period for the transmission burst based on the scheduling indication. In an aspect, the power mode component 412, e.g., in conjunction with the processor(s) 402, memory 403, and/or UE transceiver 404, can enter the DRX OFF mode to suspend communication resources during at least the off period corresponding to the portion of the time period for the transmission burst based on the scheduling indication.

As described, in an example, suspending communication resources in the DRX OFF mode during the off period may include reducing or removing power from one or more communication resources, such as one or more components of the transceiver 404 (e.g., a receiver, receiver processor, power amplifier, etc.) or one or more other RF front end components such to conserve power by not attempting to receive or monitor communication channels during the off period. In one example, the scheduling indication may indicate the off period in the time period for the transmission burst.

In another example, entering the DRX OFF mode at Block 608 may optionally include, at Block 610, determining the off period based at least in part on determining that communications are not scheduled during the portion of the time period for the transmission burst. In an aspect, the power mode component 412, e.g., in conjunction with the processor(s) 402, memory 403, and/or UE transceiver 404, can determine the off period based at least in part on determining that communications are not scheduled during the portion of the time period for the transmission burst. For example, where the scheduling indication includes identifiers of UEs corresponding to the transmission burst, the power mode component 412 can determine the off period to be a remaining time period for the transmission burst after the communicating component 361 receives the communications (e.g., or an end indication indicating the end of the transmission, completion, or expiration of communications or related resources) from the access point 405. In another example, where the scheduling indication includes a position indication indicating the position of communication resources scheduled for the UE 415 within the transmission burst, the power mode component 412 can determine the off period in portions of the time period corresponding to the transmission burst where communications are not scheduled for the UE 415. In any case, the power mode component 412 can enter DRX OFF mode to conserve communication resources during the determined off period.

In addition, the method 600 may include, at Block 612, entering a DRX ON mode to activate the communication resources during an on period corresponding to another portion of the time period or a different time period based on the scheduling indication. In an aspect, the power mode component 412, e.g., in conjunction with the processor(s) 402, memory 403, and/or UE transceiver 404, can enter the DRX ON mode to activate the communication resources during the on period corresponding to another portion of the time period or the different time period based on the scheduling indication. For example, the power mode component 412 may enter the DRX ON mode during the transmission burst where it is determined that the UE 415 is scheduled (or possibly scheduled) to receive communications in other portions of the time period for the transmission burst. In an additional or alternative example, the power mode component 412 may enter the DRX ON mode in a different time period following the transmission burst (e.g., in another time period corresponding to another transmission burst, another possible LBT frame, etc., or to identify another transmission burst, another possible LBT frame, etc.).

In an example, entering the DRX ON mode at Block 612 may optionally include, at Block 614, determining the on period based at least in part on determining that communications are scheduled during the another portion of the time period for the transmission burst. In an aspect, the power mode component 412, e.g., in conjunction with the processor(s) 402, memory 403, and/or UE transceiver 404, can determine the on period based at least in part on determining that communications are scheduled during the another portion of the time period for the transmission burst. In the example above, where UE 415 receives the scheduling indication as a bitmap indicating position of resources within the transmission burst that correspond to communications for UE 415, the power mode component 412 can enter the DRX ON mode in the portions of the time period corresponding to the set bits of the bitmap, while entering the DRX OFF mode in portions of the time period corresponding to zeroed bits of the bitmap.

In another example, entering the DRX ON mode at Block 612 may optionally include, at Block 616, determining the on period as the different time period corresponding to the transmission burst or a subsequent transmission burst. In an aspect, the power mode component 412, e.g., in conjunction with the processor(s) 402, memory 403, and/or UE transceiver 404, can determine the on period as the different time period corresponding to the transmission burst or a subsequent transmission burst. For example, the power mode component 412 can determine the on period for entering the DRX ON mode after an indicated or otherwise configured time period for the transmission burst, a time period corresponding to an LBT frame of the transmission burst, etc. In one example, the power mode component 412 can determine the on period as a period of time corresponding to an end of the current LBT frame to facilitate monitoring for a next LBT frame from the access point 405. An example is shown in FIG. 7.

Figure 7:
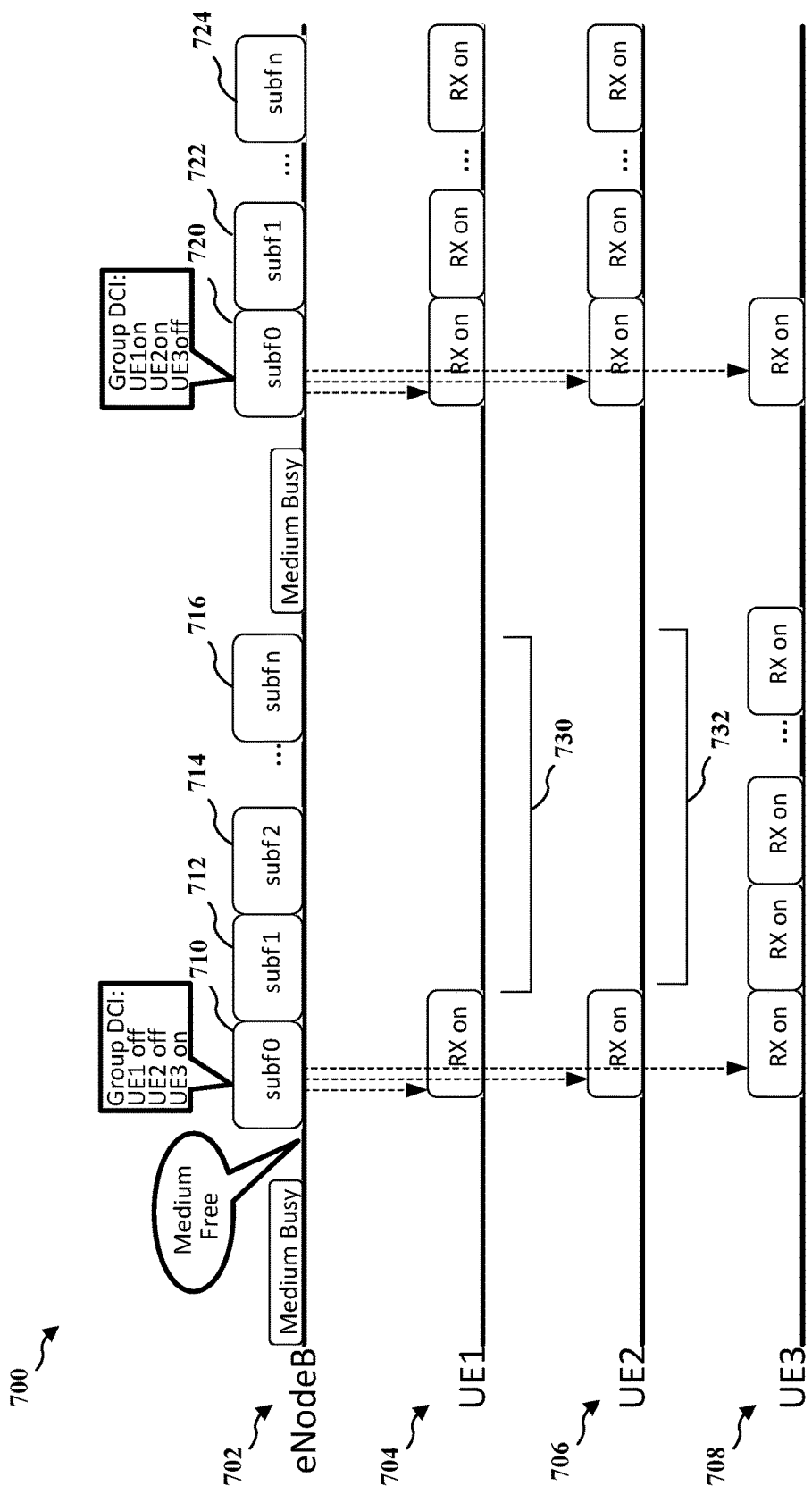
FIG. 7 illustrates an example of a communication timeline for broadcasting scheduling indications over a period of time in accordance with aspects described herein.

FIG. 7 illustrates an example of a communication timeline 700 between an eNB 702 and various UEs 704, 706, 708. As described, for example, eNB 702 may communicate over contention-based resources (e.g., in an unlicensed frequency band such as that for WiFi) where the communication medium may initially be busy, and eNB 702 can acquire the medium when performing a successful CCA to determine the medium is free. Accordingly, the eNB 702 can begin transmitting a LBT burst in subframe 0 ("subf 0") at 710, and may transmit an indication of the LBT frame for the LBT burst (e.g., as one or more data fields in the LBT burst). In subframe 0, the eNB 702 can include a broadcast/multicast control channel that indicates a group DCI specifying a group RNTI corresponding to the scheduling indication in the broadcast/multicast control channel data. The broadcast/multicast control channel data transmitted in subframe 0 may include an indication that UE 1 704 is off (e.g., not scheduled to receive communications in the LBT frame), UE 2 706 is off, and UE 3 708 is on (e.g., scheduled to receive communications in the LBT frame). In one example, this can include a bitmap with bits or values to represent on/off status for each of the UEs, e.g., UE 1 704, UE 2 706, and UE 3 708.

In this example, UE 1 704 and UE 2 706 can both receive subframe 0 710 and determine that they are not scheduled to receive communications in the transmission burst from eNB 702. In an example, UE 1 704 and UE 2 796 can initially detect that the communications correspond to an LBT frame from the eNB 702. Based on the scheduling indication, UE 1 704 and UE 2 706 can accordingly enter DRX OFF mode for a remainder of the time period corresponding to the transmission burst (e.g., the time indicated at 730, 732). For example, the time indicated at 730, 732 may correspond to a time indicated for the LBT frame and/or associated transmission burst. For example, the time period corresponding to the transmission burst may be indicated in subframe 0 710 and/or may be known based on a received configuration, a configuration of the wireless communication technology (e.g., WiFi), etc. Thus, UE 1 704 and UE 2 706 may suspend communication resources until the end of the LBT frame to monitor for a next LBT frame. In addition, UE 3 708 can receive subframe 0 710 and determine that it is scheduled to receive communications in the transmission burst from eNB 702. Based on this scheduling indication, UE 3 708 can accordingly remain in DRX ON mode for at least a portion of the remainder of the time period corresponding to the transmission burst to receive communications from the eNB 702 in subframe 1 712, subframe 2 714, . . . subframe n 716, etc.

Additionally, for a next transmission burst, UE 1 704, UE 2 706, and UE 3 708 can activate communication resources to operate in DRX ON mode, as described, to receive at least subframe 0 720 once the eNB 702 acquires the channel. UE 1 704 and UE 2 706 can both receive subframe 0 720 and determine that they are scheduled to receive communications in the next transmission burst from eNB 702. Based on this scheduling indication, UE 1 704 and UE 2 706 can accordingly remain in DRX ON mode for at least a portion of a remainder of the time period corresponding to the next transmission burst to receive communications from the eNB 702 in subframe 1 722, . . . subframe n 724, etc. For example, the time period corresponding to the transmission burst may be indicated in subframe 0 720 and/or may be known based on a received configuration, a configuration of the wireless communication technology (e.g., WiFi), etc. In addition, UE 3 708 can receive subframe 0 720 and determine that it is not scheduled to receive communications in the next transmission burst from the eNB 702. Based on this scheduling indication, UE 3 708 can accordingly switch to DRX OFF mode for the remainder of the time period corresponding to the transmission burst.

In an example, the indication receiving component 410 may receive or detect the scheduling indication in the broadcast/multicast control channel in a DCI format, which may be a new format or a format defined in LTE. In another example, the indication receiving component 410 may receive or detect the scheduling indication in the broadcast/multicast control channel in a PDSCH transmitted by the access point 405. In either case, the DCI may be masked with the group RNTI or another RNTI for scheduling indications, and indication receiving component 410 can detect the scheduling indication based on applying the RNTI to unmask the communication from access point 405. In another example, indication receiving component 410 may receive or detect the scheduling indication in one or more SIBs or other system information broadcasted by access point 405 in the transmission burst.

Moreover, for example, the scheduling indication may include other information for determining the periods for entering DRX OFF or DRX ON mode. For example, the other information may include a downlink/uplink split indicating a number or portion of time periods of an LBT burst assigned to downlink/uplink communications, an indication of an uplink grant, which may indicate an end of a transmission burst, a number of uplink subframes in the LBT burst, etc. In an example, power mode component 412 can determine when to enter a DRX OFF mode and/or a DRX ON mode based on the additional information (e.g., enter a DRX OFF mode from a point in time until the uplink portion or uplink grant in the LBT burst by determining the time until the uplink portion or uplink grant based on the downlink/uplink split indication, the indication of time resources corresponding to the uplink grant, the time indication of the end of a downlink burst portion of the LBT frame, etc.).

Referring back to FIG. 6, in another example, receiving the transmission burst at Block 604 may optionally include, at Block 618, receiving the scheduling indication in a unicast control channel in the transmission burst. In an aspect, the indication receiving component 410, e.g., in conjunction with the processor(s) 402, memory 403, and/or UE transceiver 404, can receive the scheduling indication in a unicast control channel in the transmission burst. In an example, the indication receiving component 410 can receive the scheduling indication in its downlink or uplink control channel from the access point 405 (e.g., include with the downlink or uplink control data in an associated control channel). For example, a DCI used for a downlink or uplink grant from the access point 405 to the UE 415 can be modified to include one or more of a resource allocation for a current TTI, a flag to indicate if there are any future resource grants for the UE 415 in the LBT frame, a bitmap or length of future TTIs activated for downlink communications to the UE 415, an indication of whether the grant is applied to all future TTIs in the LBT frame, time properties of the scheduling indication (e.g., valid period, expiration time, sleep period, wake-up time, etc.), additional uplink/downlink control information (e.g., uplink/downlink split, uplink grant information, number of uplink subframes in the LBT burst, etc.), and/or the like. As described above, the indication receiving component 410 can accordingly receive this information in the downlink/uplink grant from the access point 405 and accordingly determine one or more DRX OFF or DRX ON modes or corresponding time periods for the transmission burst. For example, the indication receiving component 410 can determine a DRX OFF mode based on determining the resource allocation for the current TTI, based on the flag indicating that there are future resource grants for the UE 415 in the LBT frame, based on a bitmap indicating a TTI activated for downlink communications to the UE 415 in the transmission burst and/or the corresponding length of TTIs, etc. In addition, for example, the indication receiving component 410 can determine a length of the DRX OFF mode (and/or DRX ON mode) based on the time properties of the scheduling indication (e.g., to include the valid period for DRX OFF mode where the UE 415 is scheduled or DRX ON mode where the UE is not scheduled), to expire at the expiration time, etc.), based on the uplink/downlink split (e.g., to include a number of subframes for DRX ON that correspond to at least the uplink portion of the uplink split where the UE 415 is not scheduled and/or to include the downlink portion of the split where the UE 415 is not scheduled, etc.), based on the uplink grant information (e.g., to include a number of subframes for DRX OFF where an uplink grant for the UE 415 is included in control information), etc.

In another example, the indication receiving component 410 can receive the scheduling indication in MAC control element from the access point 405 (e.g., transmitted in the transmission burst). An example of unicast signaling the scheduling indication is shown in FIG. 8.

Figure 8:
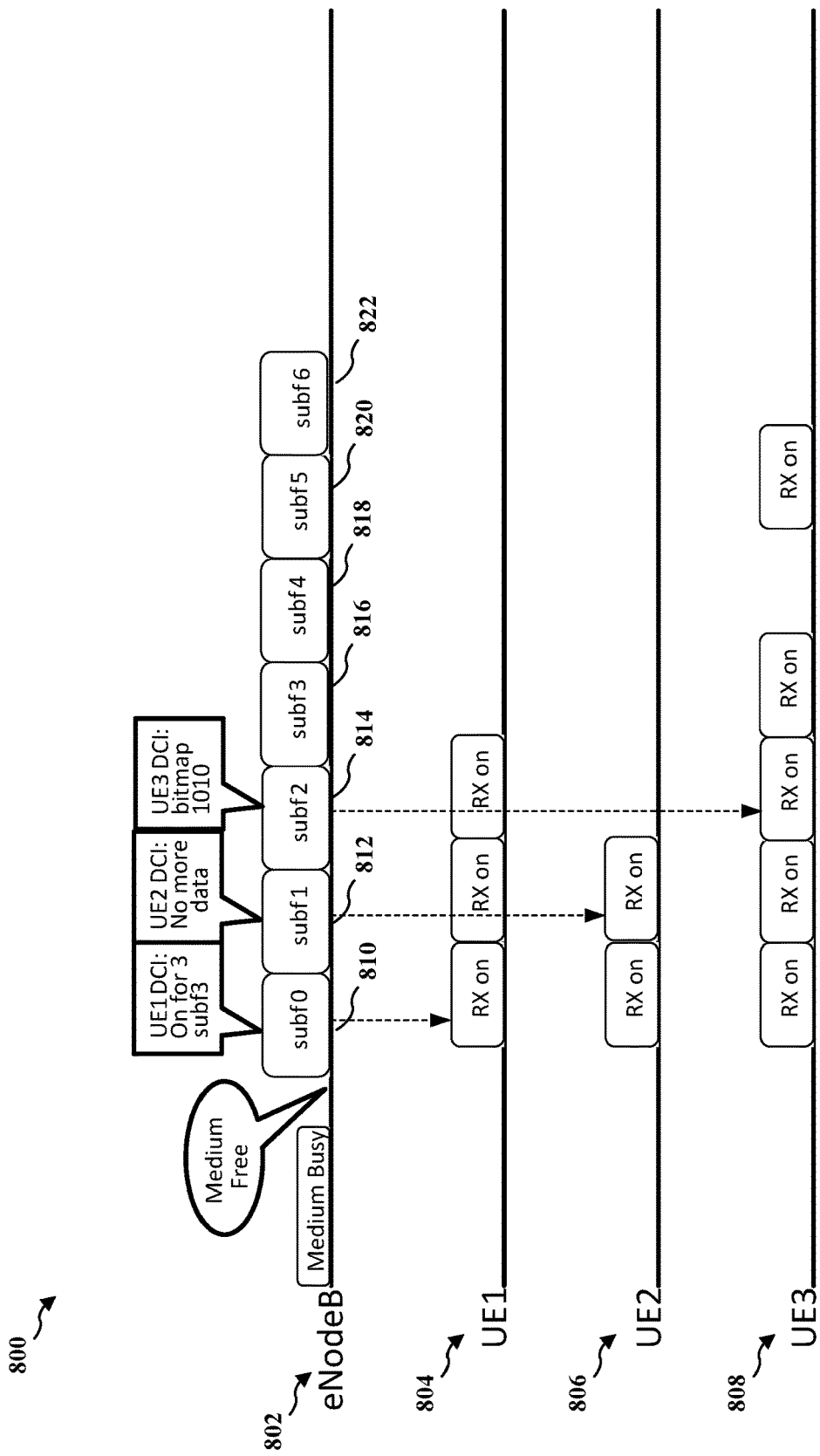
FIG. 8 illustrates an example of a communication timeline for transmitting scheduling indications using unicast signaling over a period of time in accordance with aspects described herein.

FIG. 8 illustrates an example communication timeline 800 between an eNB 802 and various UEs 804, 806, 808. As described, for example, the eNB 802 may communicate over contention-based resources (e.g., in an unlicensed frequency band such as that for WiFi) where the communication medium may initially be busy, and the eNB 802 can acquire the medium when performing a successful CCA to determine the medium is free. UE 1 804, UE 2 806, and UE 3 808 can be in a DRX ON mode to receive communications from eNB 802 (e.g., based on termination of a previous LBT burst or corresponding LBT frame). Accordingly, eNB 802 can begin transmitting a LBT burst in subframe 0 at 810, which may also include indicating a LBT frame is being transmitted by the eNB 802 based on acquiring the communication medium (e.g., based on successful CCA). In subframe 0, eNB 802 can include a unicast control channel with a scheduling indication in the form of a DCI for UE 1 804 indicating the UE 1 804 is on (e.g., to receive communications from eNB 802) for 3 subframes. Accordingly, UE 1 804 can receive the DCI in its unicast control channel and remain in DRX ON mode for subframes 810, 812, and 814, after which UE 1 804 can switch to DRX OFF mode (e.g., at least for the remainder of the LBT burst). In another example, eNB 802 can include a scheduling indication in the form of a DCI for UE 2 806 in subframe 1 812, which indicates that there is no more data for UE 2 806 (e.g., that the scheduled communications in the LBT frame have expired or completed). Accordingly, UE 2 806 can transition to DRX OFF mode after subframe 1 812 (e.g., for a remainder of the LBT burst). Still in another example, eNB 802 can include a scheduling indication in the form of a DCI for UE 3 808 in subframe 2 814, which indicates a bitmap of scheduling for the UE 3 808 subsequent to subframe 2 814 as '1010'. Accordingly, UE 3 808 can remain in the DRX ON mode for subframe 3 816, may optionally transition to DRX OFF mode for subframe 4 818 and then transition back to DRX ON mode for subframe 5 820, and transition to DRX OFF mode for subframe 822 and/or a remainder of the LBT burst based on the bitmap.

In an example, indication receiving component 410 may receive the scheduling indication in the broadcast/multicast and/or unicast control channels, and the power mode component 412 can accordingly determine whether to and/or when to activate a DRX ON or DRX OFF duration based on the scheduling indication, as described above.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for configuring a discontinuous receive (DRX) mode in wireless communications, comprising:
    detecting, at a user equipment (UE), a listen-before-talk (LBT) frame received from an access point;
    receiving, at the UE, a transmission burst over the LBT frame from the access point, wherein the transmission burst includes a scheduling indication in a broadcast communication portion of the transmission burst, wherein at least the broadcast communication portion of the transmission burst is masked with a group radio network temporary identifier (RNTI);
    entering, at the UE and based at least in part on the scheduling indication, a DRX OFF mode to suspend communication resources during at least an off period corresponding to a portion of a time period for the transmission burst, wherein entering the DRX OFF mode is based at least in part on detecting masking of the broadcast communication portion is with a radio network temporary identifier (RNTI) for a different group; and
    entering, at the UE and based at least in part on the scheduling indication, a DRX ON mode to activate the communication resources during an on period corresponding to another portion of the time period subsequent to the off period defined for the transmission burst.

2. The method of claim 1, further comprising determining the on period based at least in part on an expiration of scheduled communications for the UE as specified in the scheduling indication.

3. The method of claim 1, wherein entering the DRX ON mode is based at least in part on detecting an end of the time period defined for the transmission burst.

4. The method of claim 1, wherein entering the DRX ON mode is based at least in part on a downlink/uplink split, an uplink grant, or a number of subframes in the transmission burst, as specified in the scheduling indication.

5. The method of claim 1, further comprising receiving, at the UE, in a subsequent transmission burst, a second scheduling indication, wherein the second scheduling indication indicates a plurality of UEs scheduled to receive downlink or send uplink communications in the transmission burst, wherein the plurality of UEs include the UE.

6. The method of claim 5, wherein the second scheduling indication includes identifiers of each of the plurality of UEs.

7. The method of claim 5, wherein the second scheduling indication includes one or more scheduling bitmaps indicating portions of the subsequent transmission burst scheduled for communications to at least a portion of the plurality of UEs, and further comprising determining at least one of a second off period or a second on period based at least in part on determining a portion of the subsequent transmission burst scheduled for communications for the UE based on the one or more scheduling bitmaps.

8. The method of claim 1, further comprising receiving, at the UE, in a subsequent transmission burst, a second scheduling indication, wherein the second scheduling indication includes information regarding one or more time periods related to the second scheduling indication, and further comprising determining at least one of a second off period or a second on period based at least in part on the information regarding the one or more time periods.

9. The method of claim 1, further comprising receiving, during a subsequent transmission burst, an end indication that communications in the subsequent transmission burst are completed for the UE, and entering the DRX OFF mode based at least in part on receiving the end indication.

10. The method of claim 1, wherein receiving the scheduling indication is in a part of the time period of the transmission burst configured by the access point.

11. The method of claim 1, further comprising receiving, at the UE, in a subsequent transmission burst, wherein at least a subsequent broadcast communication portion of the subsequent transmission burst is masked with the group RNTI, and further comprising detecting the subsequent broadcast communication portion based at least in part on detecting masking of the subsequent broadcast communication portion with the group RNTI.

12. The method of claim 1, wherein the scheduling indication is received in one or more system information blocks in the broadcast communication portion.

13. The method of claim 1, wherein the scheduling indication is received in a unicast control channel portion of the transmission burst.

14. The method of claim 13, further comprising detecting the scheduling indication in the transmission burst based at least in part on detecting a resource grant in the unicast control channel portion along with a media access control (MAC) layer control element (CE).

15. The method of claim 1, further comprising detecting the scheduling indication in a media access control (MAC) control element (CE) sent along with data in the transmission burst.

16. An apparatus for configuring a discontinuous receive (DRX) mode in wireless communications, comprising:

a transceiver for communicating one or more wireless signals via one or more antennas;
a memory configured to store instructions; and
one or more processors communicatively coupled with the transceiver and the memory, wherein the one or more processors are configured to:
detect, at a user equipment (UE), a listen-before-talk (LBT) frame received from an access point;
receive, at the UE, a transmission burst over the LBT frame from the access point, wherein the transmission burst includes a scheduling indication in a broadcast communication portion of the transmission burst, wherein at least the broadcast communication portion of the transmission burst is masked with a group radio network temporary identifier (RNTI);
enter, at the UE and based at least in part on the scheduling indication, a DRX OFF mode to suspend communication resources during at least an off period corresponding to a portion of a time period for the transmission burst, wherein entering the DRX OFF mode is based at least in part on detecting masking of the broadcast communication portion is with a radio network temporary identifier (RNTI) for a different group; and
enter, at the UE and based at least in part on the scheduling indication, a DRX ON mode to activate the communication resources during an on period corresponding to another portion of the time period subsequent to the off period defined for the transmission burst.

17. The apparatus of claim 16, wherein the one or more processors are further configured to determine the on period based at least in part on an expiration of scheduled communications for the UE as specified in the scheduling indication.

18. The apparatus of claim 16, wherein the one or more processors are configured to enter the DRX ON mode based at least in part on detecting an end of the time period defined for the transmission burst.

19. The apparatus of claim 16, wherein the one or more processors are configured to enter the DRX ON mode based at least in part on a downlink/uplink split, an uplink grant, or a number of subframes in the transmission burst, as specified in the scheduling indication.

20. The apparatus of claim 16, wherein the one or more processors are configured to receive, at the UE, in a subsequent transmission burst, a second scheduling indication, wherein the second scheduling indication indicates a plurality of UEs scheduled to receive downlink or send uplink communications in the transmission burst, wherein the plurality of UEs include the UE.

21. The apparatus of claim 20, wherein the second scheduling indication includes identifiers of each of the plurality of UEs.

22. The apparatus of claim 20, wherein the second scheduling indication includes one or more scheduling bitmaps indicating portions of the subsequent transmission burst scheduled for communications to at least a portion of the plurality of UEs, and wherein the one or more processors are further configured to determine at least one of a second off period or a second on period based at least in part on determining a portion of the subsequent transmission burst scheduled for communications for the UE based on the one or more scheduling bitmaps.

23. The apparatus of claim 16, wherein the one or more processors are further configured to receive, at the UE, in a subsequent transmission burst, a second scheduling indication, wherein the second scheduling indication includes information regarding one or more time periods related to the second scheduling indication, and further comprising determining at least one of a second off period or a second on period based at least in part on the information regarding the one or more time periods.

24. The apparatus of claim 16, wherein the one or more processors are further configured to receive, during a subsequent transmission burst, an end indication that communications in the subsequent transmission burst are completed for the UE, and enter the DRX OFF mode based at least in part on receiving the end indication.

25. The apparatus of claim 16, wherein the one or more processors are configured to receive the scheduling indication in a part of the time period of the transmission burst configured by the access point.

26. The apparatus of claim 16, wherein the one or more processors are further configured to receive, at the UE, in a subsequent transmission burst, wherein at least a subsequent broadcast communication portion of the subsequent transmission burst is masked with the group RNTI, and wherein the one or more processors are further configured to detect the subsequent broadcast communication portion based at least in part on detecting masking of the subsequent broadcast communication portion with the group RNTI.

27. An apparatus for configuring a discontinuous receive (DRX) mode in wireless communications, comprising:
  means for detecting, at a user equipment (UE), a listen-before-talk (LBT) frame received from an access point;
  means for receiving, at the UE, a transmission burst over the LBT frame from the access point, wherein the transmission burst includes a scheduling indication in a broadcast communication portion of the transmission burst, wherein at least the broadcast communication portion of the transmission burst is masked with a group radio network temporary identifier (RNTI);
  means for entering, at the UE and based at least in part on the scheduling indication, a DRX OFF mode to suspend communication resources during at least an off period corresponding to a portion of a time period for the transmission burst, wherein entering the DRX OFF mode is based at least in part on detecting masking of the broadcast communication portion is with a radio network temporary identifier (RNTI) for a different group; and
  means for entering, at the UE and based at least in part on the scheduling indication, a DRX ON mode to activate the communication resources during an on period corresponding to another portion of the time period subsequent to the off period defined for the transmission burst.

28. The apparatus of claim 27, further comprising means for determining the on period based at least in part on an expiration of scheduled communications for the UE as specified in the scheduling indication.

29. A non-transitory computer-readable medium, comprising code executable by one or more processors for configuring a discontinuous receive (DRX) mode in wireless communications, the code comprising code for:
  detecting, at a user equipment (UE), a listen-before-talk (LBT) frame received from an access point;
  receiving, at the UE, a transmission burst over the LBT frame from the access point, wherein the transmission burst includes a scheduling indication in a broadcast communication portion of the transmission burst, wherein at least the broadcast communication portion of the transmission burst is masked with a group radio network temporary identifier (RNTI);
  entering, at the UE and based at least in part on the scheduling indication, a DRX OFF mode to suspend communication resources during at least an off period corresponding to a portion of a time period for the transmission burst, wherein entering the DRX OFF mode is based at least in part on detecting masking of the broadcast communication portion is with a radio network temporary identifier (RNTI) for a different group; and
  entering, at the UE and based at least in part on the scheduling indication, a DRX ON mode to activate the communication resources during an on period corresponding to another portion of the time period subsequent to the off period defined for the transmission burst.

30. The non-transitory computer-readable medium of claim 29, further comprising code for determining the on period based at least in part on an expiration of scheduled communications for the UE as specified in the scheduling indication.

* * * * *